United States Patent
Wetsel et al.

(10) Patent No.: US 12,067,092 B2
(45) Date of Patent: Aug. 20, 2024

(54) 3D PASSCODE PROVIDED IN VIRTUAL SPACE

(71) Applicant: Lenovo (Singapore) Pte. Ltd., Singapore (SG)

(72) Inventors: Peter Wetsel, Apex, NC (US); Mayan Shay May-Raz, Morrisville, NC (US); Andrew Hansen, Morrisville, NC (US); Alec Hoffman, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 243 days.

(21) Appl. No.: 17/710,024

(22) Filed: Mar. 31, 2022

(65) Prior Publication Data

US 2023/0315822 A1    Oct. 5, 2023

(51) Int. Cl.
*G06F 21/31*    (2013.01)
*G06F 3/04815*  (2022.01)
*G06T 19/00*    (2011.01)

(52) U.S. Cl.
CPC .......... *G06F 21/31* (2013.01); *G06F 3/04815* (2013.01); *G06T 19/006* (2013.01)

(58) Field of Classification Search
CPC .... G06F 21/31; G06F 3/04815; G06T 19/006
USPC .......................................................... 726/7
See application file for complete search history.

(56) References Cited

U.S. PATENT DOCUMENTS

| | | | |
|---|---|---|---|
| 10,754,939 B2* | 8/2020 | Farkash | G06F 21/31 |
| 11,055,394 B2* | 7/2021 | Norris, III | G06F 21/36 |
| 11,334,656 B2* | 5/2022 | Brantley | G06T 19/003 |
| 2016/0055330 A1* | 2/2016 | Morishita | G06F 1/163 726/19 |
| 2016/0188865 A1* | 6/2016 | Tao | G06F 21/36 726/19 |
| 2018/0136743 A1* | 5/2018 | Seegmiller | A63F 13/428 |
| 2019/0114410 A1* | 4/2019 | Chung | G06F 21/31 |
| 2019/0236259 A1* | 8/2019 | Remillet | G06F 3/0482 |
| 2021/0089638 A1* | 3/2021 | Seiler | G06F 3/011 |
| 2021/0089639 A1* | 3/2021 | Remillet | G06F 21/32 |

(Continued)

OTHER PUBLICATIONS

Ceenu et al., Investigating the Third Dimension for Authentication in Immerse Virtual Reality and in the Real World, IEEE, Mar. 23-27, 2019 (Year: 2019).*

(Continued)

*Primary Examiner* — Thanh T Le

(74) *Attorney, Agent, or Firm* — John L. Rogitz; John M. Rogitz

(57) ABSTRACT

In one aspect, a device includes a processor and storage accessible to the processor. The storage includes instructions executable by the processor to present, on a display and in virtual space, at least first and second three-dimensional (3D) objects to which user input is directable in a particular sequence to provide a passcode associated with the device. The instructions are also executable to identify receipt of the passcode based on detection of first user input directed in the particular sequence to the first and second 3D objects. The instructions are then executable to authenticate a user responsive to the identification. In various examples, the virtual space may form part of an augmented reality presentation, a mixed reality presentation, and/or a virtual reality presentation.

14 Claims, 6 Drawing Sheets

(56) References Cited

U.S. PATENT DOCUMENTS

2023/0177128 A1* 6/2023 Vankipuram ........... G06F 3/011
                   713/186

OTHER PUBLICATIONS

Lakier, Matthew, "3D Pattern Lock", 2022, retrieved from https://matthewlakier.com/projects/research/3dpattern/.

* cited by examiner

3D PASSCODE PROVIDED IN VIRTUAL SPACE

FIELD

The disclosure below relates to technically inventive, non-routine solutions that are necessarily rooted in computer technology and that produce concrete technical improvements. In particular, the disclosure below relates to three-dimensional (3D) passcodes provided in virtual space.

BACKGROUND

As recognized herein, current electronic device authentication is not as secure as it could be, particularly when a nefarious third party is nearby watching the user provide the authentication input to steal it. There are currently no adequate solutions to the foregoing computer-related, technological problem.

SUMMARY

Accordingly, in one aspect a device includes at least one processor and storage accessible to the at least one processor. The storage includes instructions executable by the at least one processor to present, on a display and in virtual space, at least first and second three-dimensional (3D) objects to which user input is directable in a particular sequence to provide a passcode associated with the device. The instructions are also executable to identify receipt of the passcode based on detection of first user input directed in the particular sequence to the first and second 3D objects. The instructions are then executable to authenticate a user responsive to the identification.

In various example implementations, receipt of the passcode may therefore unlock a lock screen of the device and/or unlock encrypted storage accessible to the device.

Also in various example implementations, the first and second 3D objects may be presented on the display at different respective virtual depths such that the first and second 3D objects may be virtually selectable at the respective virtual depths to provide the passcode. The first and second 3D objects may be virtually selectable by gesturing a predetermined gesture at least partially directed to the first and second 3D objects, and/or based on the user virtually tapping on the first and second 3D objects in the particular sequence.

Still further, in some example embodiments the device may include the display, and the device may be or include a headset. Also in certain examples, the first and second 3D objects may be virtual reality (VR) objects presented in VR space.

In another aspect, a method includes presenting, on a display and in virtual space, at least first and second three-dimensional (3D) objects to which user input is directable in a particular sequence to provide a passcode associated with the device. The method also includes identifying receipt of the passcode based on detection of first user input directed in the particular sequence to the first and second 3D objects. The method then includes permitting access to one or more functions of a device responsive to the identification.

Accordingly, in certain examples the method may include, to identify receipt of the passcode, detecting selection of the first 3D object while a user virtually stands at a first virtual location and detecting selection of the second 3D object while the user virtually stands at a second virtual location that is different from the first virtual location. Additionally or alternatively, to identify receipt of the passcode, the method may include detecting selection of the first 3D object as presented at a first virtual depth relative to a user and detecting selection of the second 3D object as presented at a second virtual depth relative to the user, where the second virtual depth may be different from the first virtual depth.

Also in certain example implementations, the method may include, to identify receipt of the passcode, detecting a virtual tapping of the first 3D object as presented at a first virtual depth relative to a user and detecting a virtual tapping of the second 3D object as presented at a second virtual depth relative to the user. The second virtual depth may be different from the first virtual depth. Additionally or alternatively, to identify receipt of the passcode, the method may include detecting a continuous gesture transitioning between and also directed to the first and second 3D objects as presented at different respective virtual depths relative to a user.

Furthermore, in various examples the virtual space may form part of an augmented reality (AR) presentation and/or a mixed reality (MR) presentation.

What's more, in certain example implementations the method may include authenticating a user responsive to the identification to permit access to one or more functions of a device.

In still another aspect, at least one computer readable storage medium (CRSM) that is not a transitory signal includes instructions executable by at least one processor to present, on a display and in virtual space, at least first and second three-dimensional (3D) objects to which user input is directable in a particular sequence to provide a passcode associated with the device. The instructions are also executable to identify receipt of the passcode based on detection of first user input directed in the particular sequence to the first and second 3D objects. The instructions are then executable to unlock, responsive to the identification, a function associated with a device.

Accordingly, in certain example implementations the instructions may be executable, to identify receipt of the passcode, to detect selection of the first 3D object while a user virtually stands at a first virtual location and to detect selection of the second 3D object while the user virtually stands at a second virtual location that is different from the first virtual location. Additionally or alternatively, the instructions may be executable, to identify receipt of the passcode, to detect selection of the first 3D object as presented at a first virtual depth relative to a user and to detect selection of the second 3D object as presented at a second virtual depth relative to the user, where the second virtual depth may be different from the first virtual depth.

In various example implementations, the virtual space may form part of an augmented reality presentation, a mixed reality presentation, and/or a virtual reality presentation.

The details of present principles, both as to their structure and operation, can best be understood in reference to the accompanying drawings, in which like reference numerals refer to like parts, and in which:

DETAILED DESCRIPTION

Figure 1:
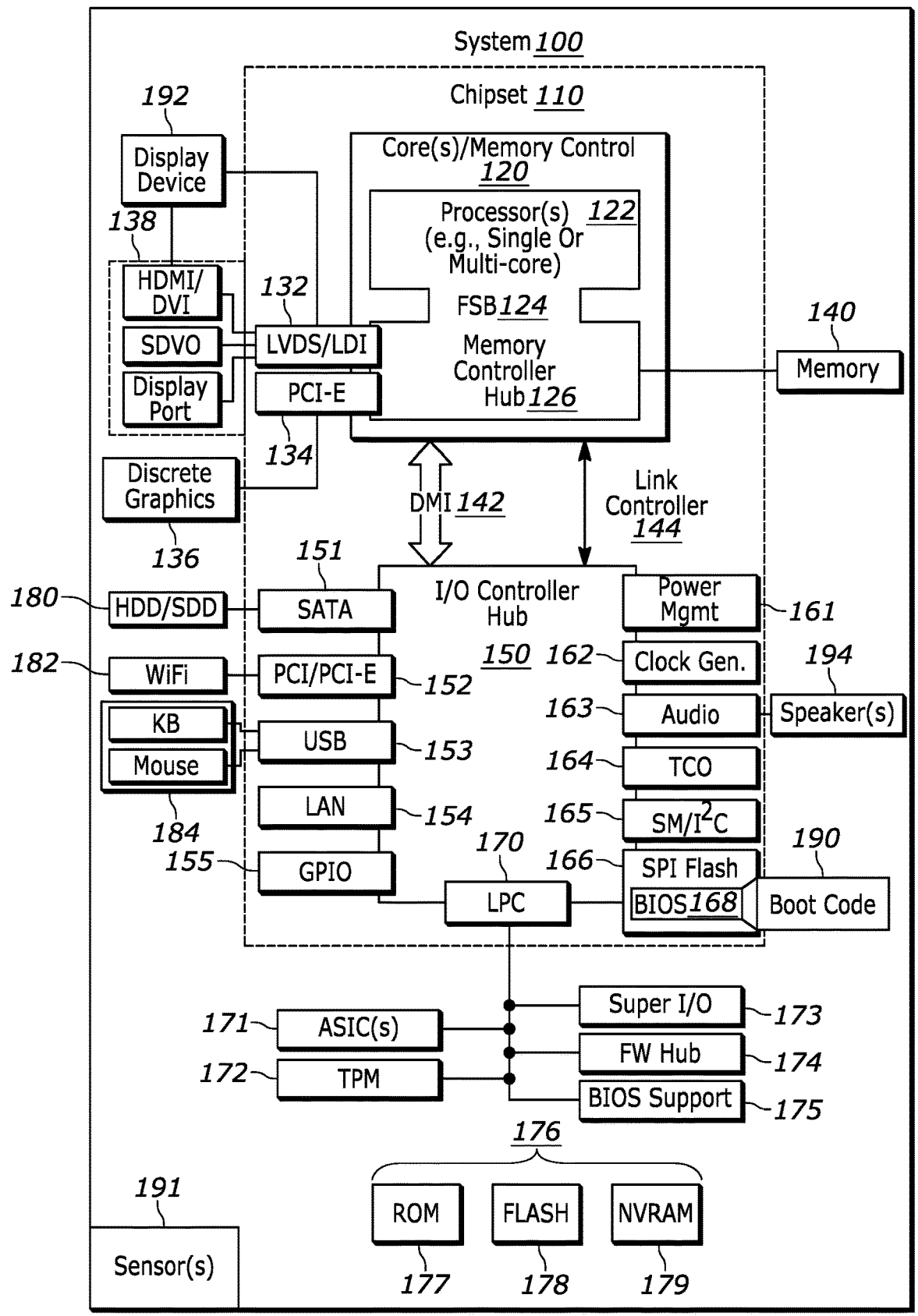
FIG. 1 is a block diagram of an example system consistent with present principles.

Among other things, the detailed description below describes systems and methods for allowing a user to set a pattern for a passcode by selecting three-dimensional (3D) graphical objects in a certain order within virtual space as presented using AR, MR, and/or VR software. The 3D object template that is presented may also present the 3D objects at differing depths from each other in virtual space relative to the user.

Thus, the user may interact with the 3D objects in a particular sequence to establish a passcode, and the device may track the user's interactions by using hand tracking, raycast, gaze detection, etc. Then after the desired pattern has been set by the user, the user can later authenticate themselves when device software displays the template pattern of 3D objects again in virtual space by repeating the saved pattern the user previously set.

Accordingly, by performing electronic authentication in virtual space, the complexity and robustness of the electronic authentication may be increased, others may not be able to discern what the user is doing to authenticate since they too are not in the virtual space with the user, and therefore a more-secure electronic authentication to a computing device may be realized.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, a camera might be on a headset being worn by a user so that the system 100 may execute computer vision and/or simultaneous localization and mapping (SLAM) using images from the camera during augmented reality (AR) and mixed reality (MR) presentations consistent with present principles.

In addition to or in lieu of the foregoing, the sensors 191 may include one or more inertial measurement sensors that might be included in an inertial measurement unit (IMU) for location tracking (e.g., dead reckoning). For example, the system 100 may be embodied in a headset and the inertial measurement sensors may be located on the headset. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
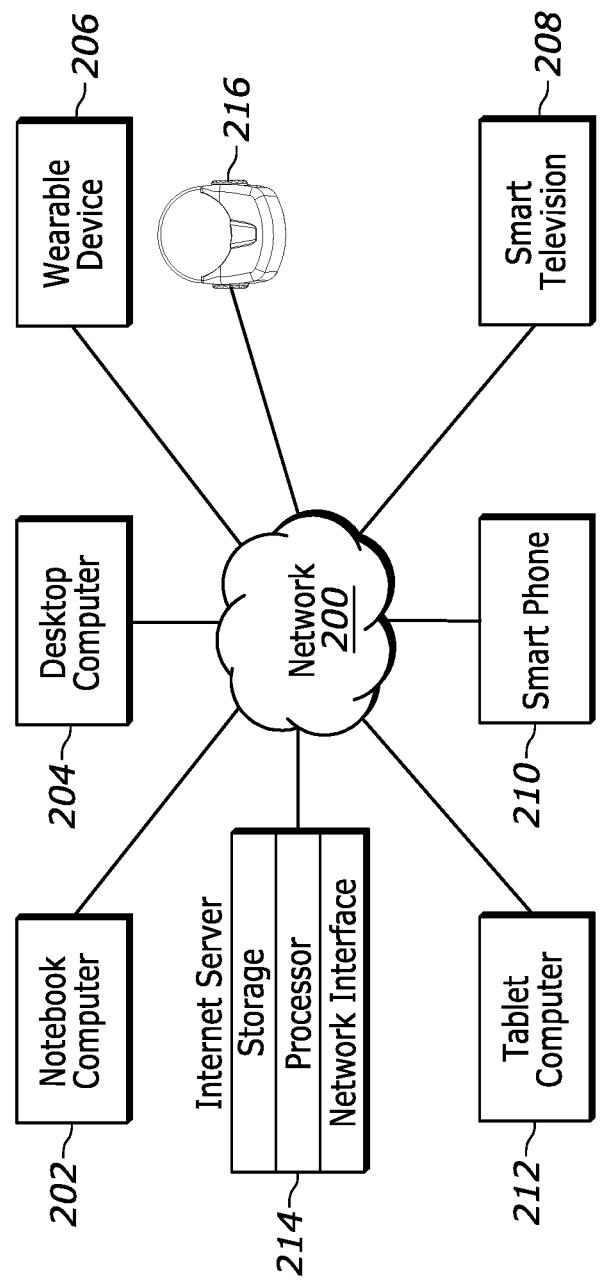
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
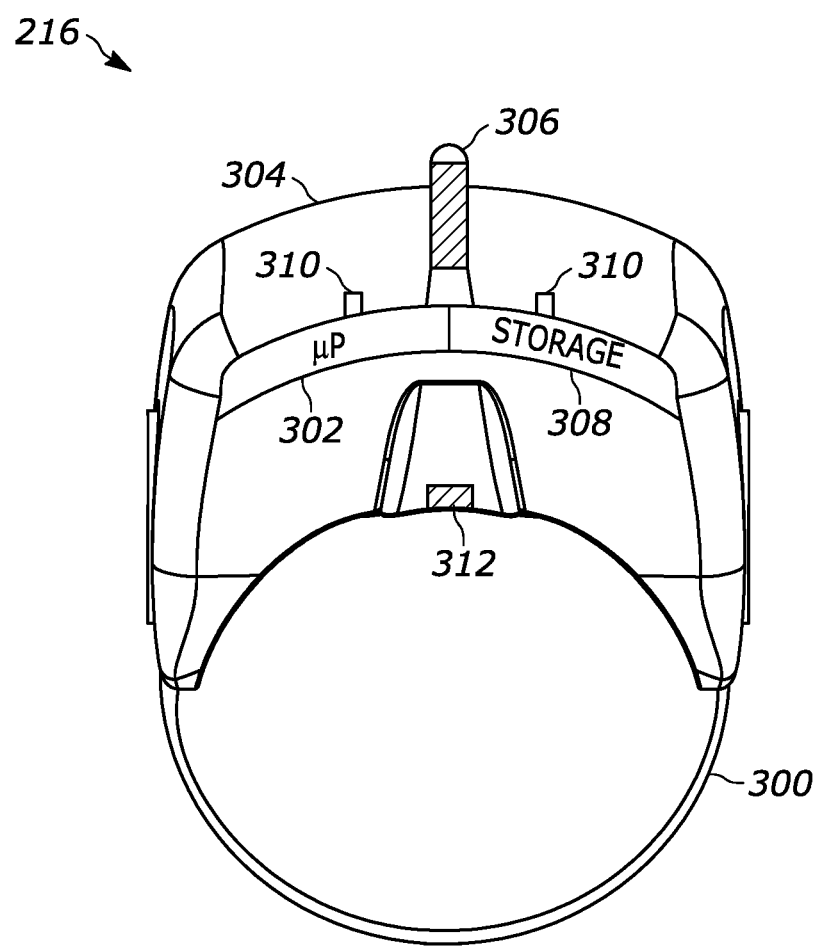
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space (e.g., as part of an AR or MR presentation or even to help the user to avoid objects in a VR presentation). However, further note that the camera(s) 306 may be located at other headset locations as well. Further note that in some examples, inward-facing cameras 310 may also be mounted within the headset 216 and oriented to image the user's eyes for eye tracking while the user wears the headset 216.

Additionally, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content.

Figure 4:
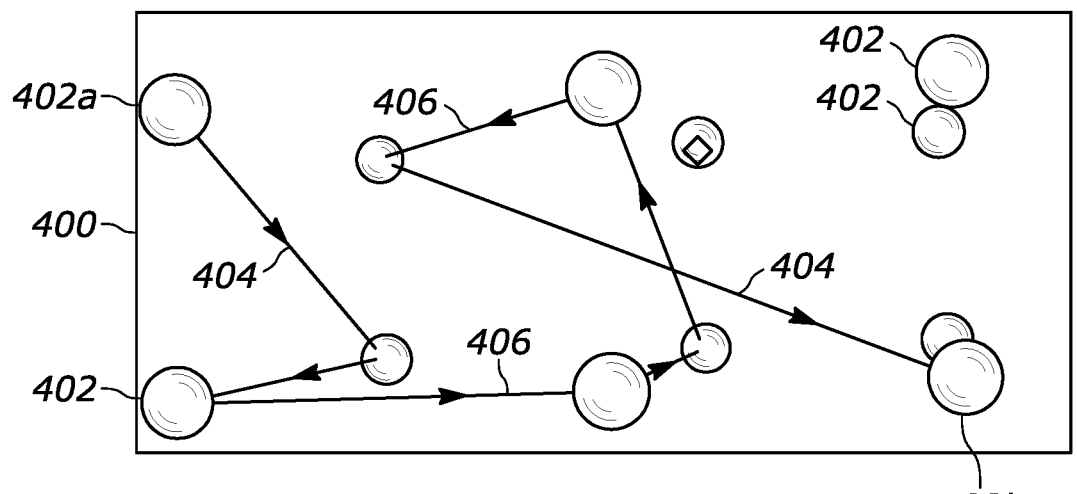
FIG. 4 shows a user's field of view (FOV) of example virtual space that includes example 3D objects that may be selected in a particular sequence to enter an example passcode consistent with present principles.

Now in reference to FIG. 4, suppose an end-user has entered a virtual space 400 to provide a passcode to unlock or otherwise access one or more functions of a device. The virtual space 400 may be presented on the display of a headset such as the headset 216, for example, so that the user but not others may view the virtual space 400. In certain examples, the virtual space 400 may be presented on the headset's display responsive to identifying the headset being engaged with or put on by a user (e.g., using touch sensors or IR proximity sensors) and prior to any other screens being presented. Also note that the passcode may be entered to unlock or access the headset itself, or to even unlock or access functions of another client device that has been paired with or otherwise connected to the headset (such as a mobile device like a smartphone or tablet computer communicating via Bluetooth communication).

In terms of the virtual space 400, note that in the example shown the virtual space 400 may be presented as part of a virtual reality (VR) simulation or presentation (e.g., in the metaverse), and therefore the 3D objects discussed below may be VR objects presented in VR space. However, in other examples the virtual space 400 may form part of an augmented reality (AR) or mixed reality (MR) simulation or presentation, where the virtual space 400 may be overlaid on and/or operate in tandem with a real-world view of the user's real-world environment according to AR and MR applications (e.g., where a transparent headset display is used or where a camera feed of the user's current real-world FOV is presented in tandem with the virtual space 400 on a non-transparent headset display).

In any case, assume the view of the virtual space 400 as shown in FIG. 4 is the end-user's FOV of the virtual space 400 while wearing the headset having the display on which the virtual space 400 is presented. As shown in FIG. 4, twelve 3D floating spheres 402 are presented, some at the same virtual depth relative to the user and some at different virtual depths closer and farther away. Note that the 3D floating spheres may also be presented at different X-Y locations as also shown as well.

Also according to the present example, to introduce further ambiguity for nefarious actors seek to gain unauthorized access to the passcode, the spheres 402 may not be numbered or lettered. The user may then virtually select one or more of the spheres 402 in a sequence the user has already set for the passcode. Selecting in sequence may include air tapping at the virtual location of each one in the designated sequence, or tracing over each one in the designated sequence in a continuous gesture according to the user's view (e.g., while actually virtually touching each one while making the continuous gesture).

FIG. 4 demonstrates the continuous gesture example in particular, where lines 404 with directional arrows 406 indicate the path from beginning to end that is traced by the user, drawing over and/or virtually touching the spheres 402 in the preset sequence in the process. Note that the lines 404 themselves are shown for illustration but, in some examples, they may actually be progressively presented to the user in real time via the headset's display as the user traces so the user can track their tracing in real time. As may also be appreciated from FIG. 4, eight spheres 402 (but not all available spheres 402) have been selected in the preset sequence, beginning with the upper left sphere 402a and ending with the lower right sphere 402b.

Additionally, in some examples, selection of the sphere 402b through the continuous gesture as the last selection in the preset sequence may by itself be used for the headset to then authenticate the user based on input of the sequence. But in other examples, the user may be required to trace over or select the sphere 402b as part of the gesture, and then provide additional input to air tap or otherwise select the sphere 402b again to provide a submit command for the headset to then authenticate the user and unlock the headset or other device in response. This might help create another layer of complexity for protecting the passcode and/or device.

Figure 5:
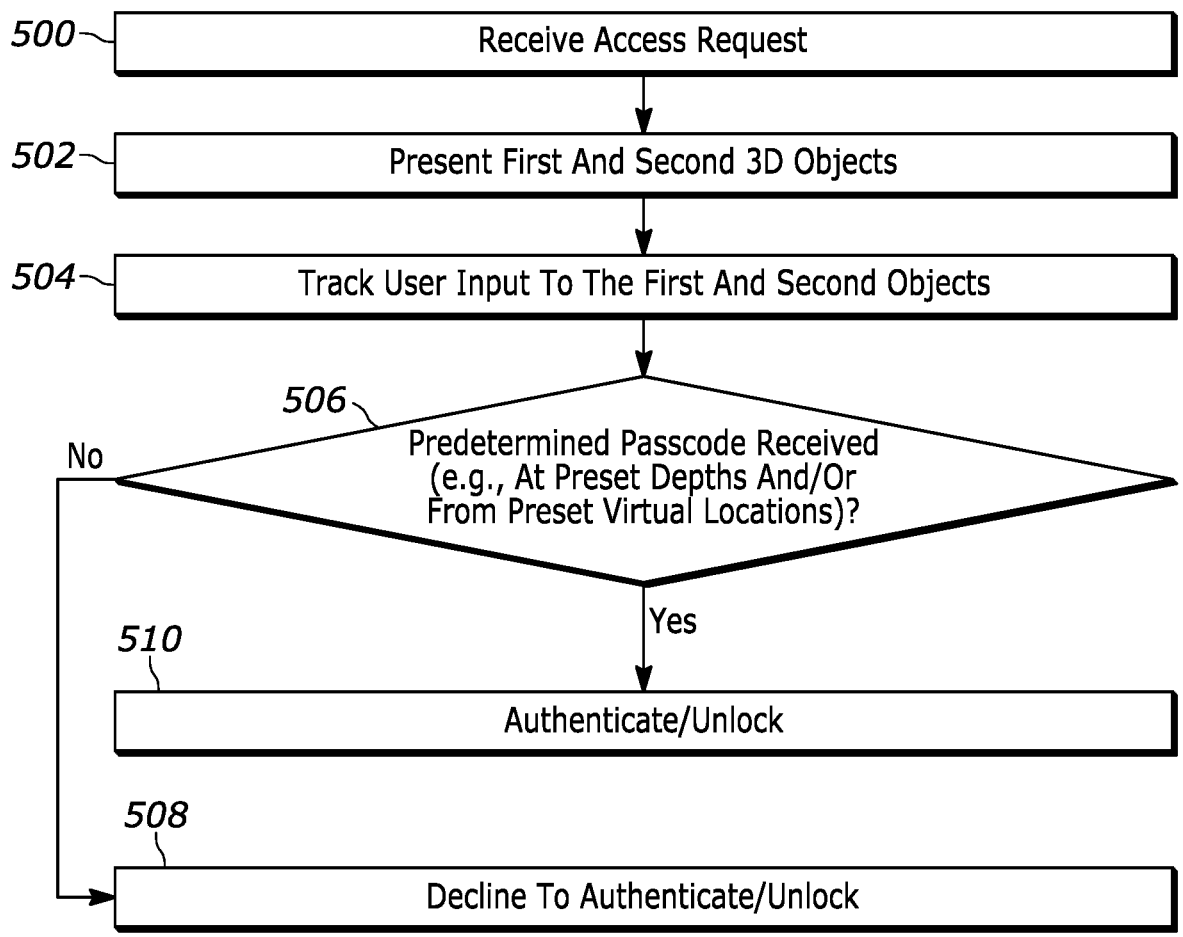
FIG. 5 illustrates example logic in example flow chart format that may be executed by a device consistent with present principles.

Before moving on to the description of FIG. 5, also note that other types of user input besides physical gestures using the user's arm and hand may also be used to select the spheres 402 in the preset sequence for the passcode. For example, a virtual laser pointer that is virtually held in the user's hand may be used to trace over the spheres 402 in the preset sequence (e.g., with the longitudinal axis of a real-life stylus or smartphone held by the user and tracked by the headset establishing the axis of the laser). Or a virtual laser coming directly out of the user's head/center of the current FOV may be used to trace over the spheres 402 in the preset sequence.

As another example, for an even more stealth way of entering the passcode, the headset may execute an eye tracking algorithm using images from inward-facing cameras on the headset that are oriented to image the user's eyes. The user may then look at the spheres 402 in the preset sequence, which may be tracked by the headset to identify the passcode based on eye gaze.

It may now be appreciated that, however selected, selection of the 3D spheres 402 in the preset sequence provides a way for the user to securely digitally authenticate themselves within a virtual environment that others would not be able to see to discern the passcode themselves. Thus, even if others were able to see the user gesturing in real space, they have no context as to what is being selected since they cannot see the headset display's presentation. Eye tracking in particular may further enhance this digital security because it would be even more difficult or impossible for others to see the user performing the authentication input due to the proximity of the headset display to the user's eyes (and possibly also due to the headset display not even being transparent in certain examples).

Referring now to FIG. 5, it shows example logic consistent with present principles that may be executed by a device such as a handset, headset, and/or remotely-located server in any appropriate combination. Note that while the logic of FIG. 5 is shown in flow chart format, other suitable logic may also be used.

Beginning at block 500, the device may receive a request to access the device, such as to unlock a lock screen of the device. Or the request may be a request to access a specific function or app of the device, to purchase a product or service online, to login to a website, or to access another function for which a user might authenticate themselves.

From block 500 the logic may proceed to block 502 where the device may present, on a display and in virtual space, at least first and second 3D objects to which user input is directable in a particular sequence to provide a passcode for authentication to access the function/device. From block 502 the logic may then move to block 504 where the device may track a user's arm and hand movements through real space using images from a camera on the device as well as gesture recognition and/or computer vision to then map those movements to the virtual space in which the first and second 3D objects are presented. Other types of user input may also be mapped to virtual space at block 504, such as eye input or input using a stylus for virtual laser pointing as described above.

Once mapped, the device may then determine at decision diamond 506 whether the predetermined passcode has been received based on the user's hand gestures (and/or other input) selecting at least the first and second 3D objects according to the predetermined sequence, pattern, and/or gesture known to the user but presumably not others. In some specific examples, the decision at diamond 506 may even be a determination of whether the end-user has selected each 3D object according to the correct sequence at its preset depth relative to the location of the user as mapped into virtual space, where each 3D object may be at a different virtual depth.

Additionally or alternatively, the determination at diamond 506 may be a determination of whether the end-user has selected each 3D object in the correct sequence from preset but different angles, perspectives, or bearings while standing at different locations within virtual space. For example, the first and second 3D objects may be hovering in a vertical plane with a north-facing side and south-facing side, and to enter the passcode the user may be required to stand facing south toward the north face of the plane to direct input to the north-facing surface of the first graphical object, and then walk around to the other side through real and virtual space to stand facing north toward the south face of the plane to direct input to the south-facing surface of the second graphical object. Thus, the user may be required to select the first and second graphical objects from different directions and locations/positions in this example.

Responsive to a negative determination at diamond 506, the logic may move to block 508 where the device may decline to authenticate the user, unlock the device, perform the function, etc. But responsive to an affirmative determination that the passcode has been received based on detection of user input directed in the particular sequence to the first and second 3D objects, the logic may instead move to block 510 where in response the device may authenticate the user, unlock the device, perform the function, etc.

Figure 6:
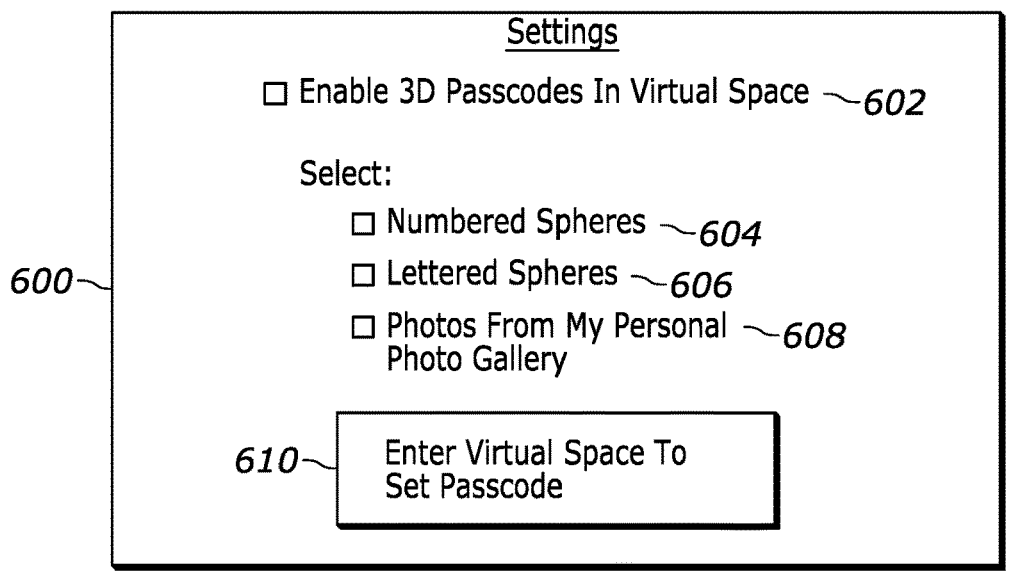
FIG. 6 shows an example graphical user interface (GUI) that may be presented on a display to configure one or more settings of a device/system to operate consistent with present principles.

Now describing FIG. 6, an example graphical user interface (GUI) 600 is shown that may be presented on the display of a device configured to undertake present principles in order to configure or enable one or more settings of that device to operate as described herein. For example, the GUI 600 may be presented on the display of a headset or handset configured to execute the logic of FIG. 5. The settings GUI 600 may therefore be reached by navigating an app menu or a settings menu of the device, for example. Also note that in the example shown, each option or sub-option discussed below may be selected by directing touch or cursor input to the respective check box adjacent to the respective option.

Accordingly, as shown in FIG. 6, the GUI 600 may include an option 602 that may be selectable a single time to set or configure the device, system, software, etc. to undertake present principles for multiple future authentication instances. For example, selection of the option 602 may configure the device to execute the logic of FIG. 5 for multiple different requests to unlock the device or access an encrypted file storage area via passcode authentication. And though not shown for simplicity, in some examples various selectable sub-options may be presented beneath the option 602 for the user to select one or more particular ways in which to select 3D objects to enter the passcode, such as an option to air-tap the 3D objects in sequence using a hand, an option to air-tap the 3D objects in sequence using another object like a stylus or virtual laser, an option to trace the 3D objects in sequence with continuous motion using a hand, an option to trace the 3D objects in sequence with continuous motion using another object, and even an option to trace the 3D objects using eye input as described above.

As also shown in FIG. 6, the GUI 600 may include various options to select one or more types of 3D objects to use for a virtual space passcode consistent with present principles. One of these options is the option 604, which may be selectable to set or configure the device to use 3D spheres each with a different number on them, whether the number is a single-digit number, double-digit number, or even triple-digit number. Option 606 may be selected to set or configure the device to use 3D spheres each with a different letter or even different word on them. Option 608 may be selected to use different digital photos and/or videos that the end-user has taken with the device's own local camera and that have been stored in a personal photo gallery in local or cloud storage for the user. Here note that 3D versions of the photos and videos may be generated using VR graphics software for 3D presentation in the virtual space, and that if videos are used then the videos may be played at normal playback speed in the virtual space while the user enters the passcode. Further note that other types of 3D objects may also be used and that the three reflected via the options 604-608 are examples.

Regardless, once one or more of the options 604-608 have been selected, the user may select the selector 610 to enter a virtual simulation in AR, MR, or VR in which the user may be presented with a random or predetermined configuration of the relevant objects at different depths. An example of this is shown in the view of virtual space 700 shown in FIG. 7.

As shown, a floating text indication 702 prompts the end-user to select from randomly-selected photos 704-710 from the user's personal photo gallery in a particular sequence to establish the passcode, or to first drag and drop other photos from the photo gallery as shown in a thumbnail image list 712 to establish the passcode using those photos. It is to be further understood in reference to FIG. 7 that each photo 704-710 may not only be presented on the front face of a 3D box, but also that that each 3D box may have a different size and may be virtually located at a different virtual depth than the others relative to the current location of the user as mapped to virtual space. Thus, the photo 704 may be the largest and closest photo to the user, the photo 708 may be the next-largest and next-closest, the photo 710 may be the third-largest and closest, and the photo 706 may be the fourth-largest and closest. Accordingly, even if the user were to drag and drop another photo from the gallery 712 onto one of the four currently-selected photos 704-710 to replace it as one of the four potential objects to use for the passcode according to this example, the new photo would be presented at the same respective size and depth as the photo it replaced.

Figure 7:
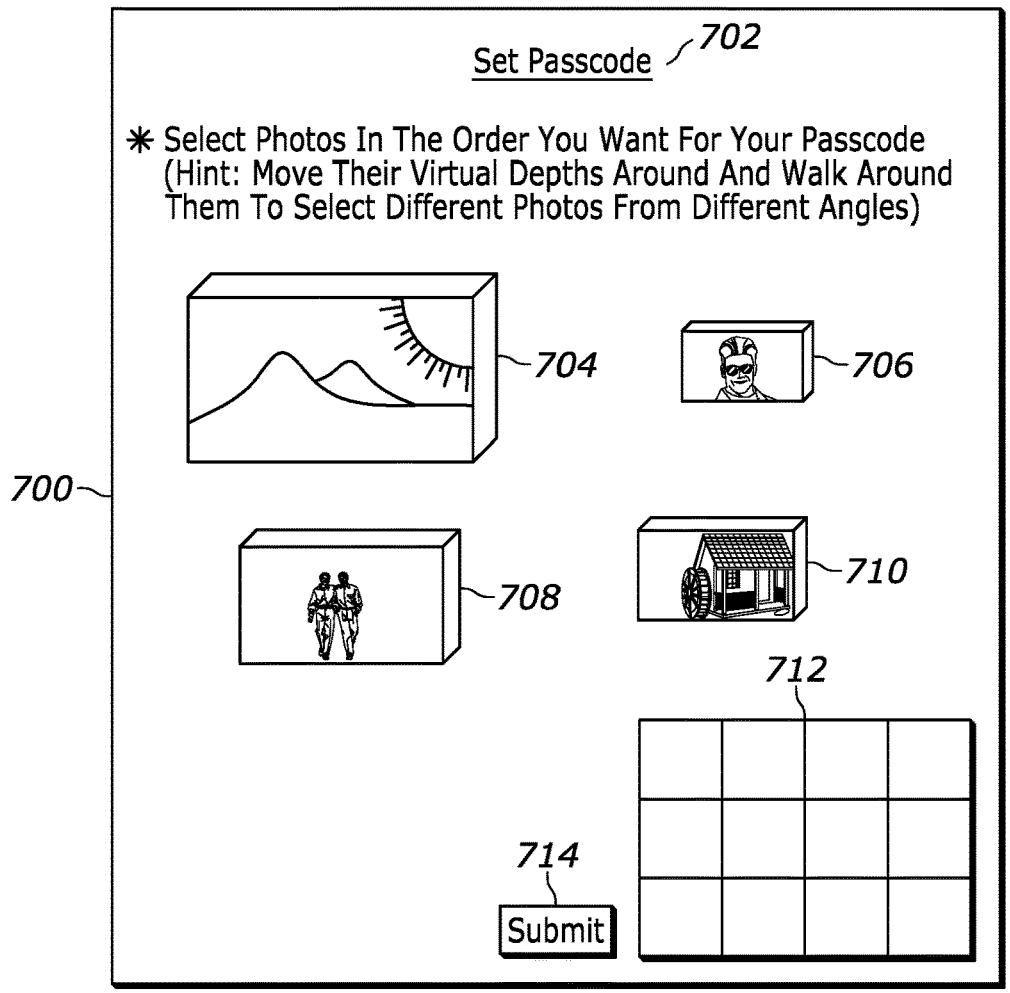
FIG. 7 shows an example GUI presented in virtual space and at which a passcode can be set consistent with present principles.

In any case, FIG. 7 also shows that in some examples the indication 702 may hint to the end-user that the end user may virtually grab each photo 704-710 with his/her hand to adjust its depth relative to the user, or that the user may even wish to select the different photos from different locations and angles as already discussed above as part of the passcode (e.g., by walking or leaning around to another side of the 3D photos 704-710).

Further note that selection of the various 3D photos 704-710 in the desired sequence may take different forms. For example, the user may establish a predetermined gesture at least partially directed to (over or touching) the various 3D photos 704-710 in the desired sequence, such as when the user makes a continuous hand gesture starting at one 3D photo, moves the hand across virtual empty space while transitioning between 3D photos, and then directs the gesture to another 3D photo before continuing on to a third 3D photo with the same continuous gesture, and so on. Thus, e.g., the user may draw a "Z" where each end point or change in direction of the tracing of the letter "Z" may be established by a different 3D photo, and also note here that the Z may be in three dimensions as the 3D photos might not even be presented at the same virtual depths relative to the user.

As another example, the user may select the various 3D photos 704-710 in the particular sequence desired to establish the passcode by virtually tapping, using the user's hand, on the 3D photos 704-710 at the respective virtual locations of the 3D photos 704-710 in the particular sequence desired. And note that here too the photos 704-710 may be located at different depths relative to the user when the user reaches to tap them in virtual space Then once the user has used one or more of the foregoing techniques to establish the passcode, the user may select the submit button 714 to save the input combination as the operative passcode. And note for completeness that the user's gestures in real-world free space may be detected using images from a forward-facing camera on the user's headset or another camera in communication with the headset along with AR/MR/VR software, computer vision and/or gesture recognition to recognize the gestures and map them to virtual space. What's more, while the example gestures described above have been referenced as being made with a user's hand, other objects and methods may also be used for selection (such as using a stylus to tap 3D objects rather than the user's finger, or using a virtual laser pointer like a raycast to select the 3D objects in the sequence desired for the passcode).

Figure 8:
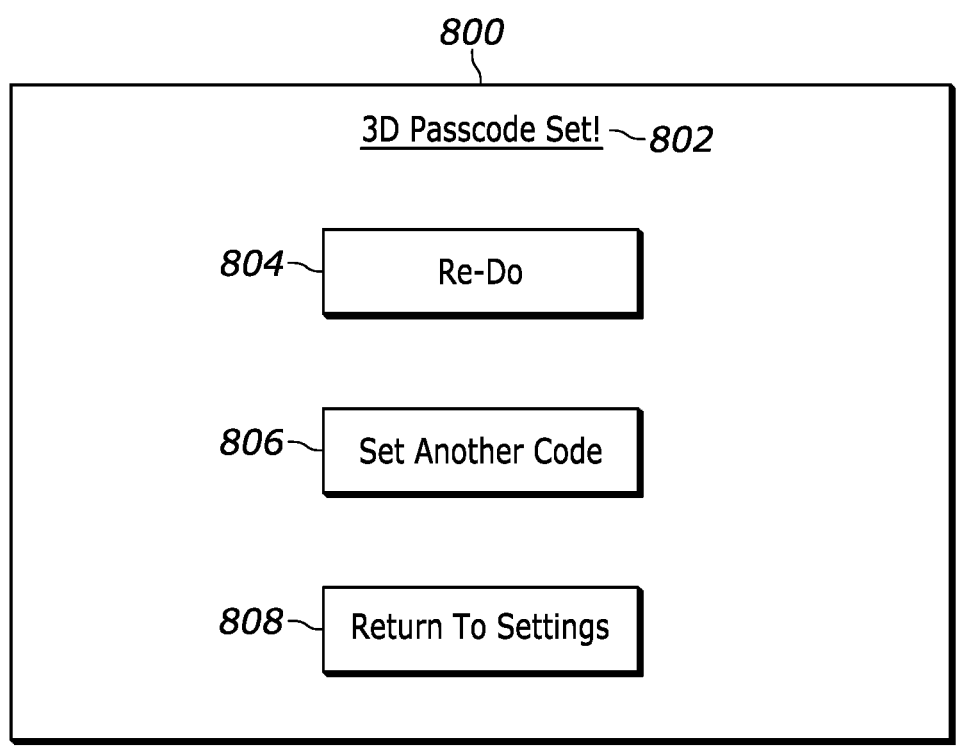
FIG. 8 shows an example confirmation GUI indicating that a passcode has been set consistent with present principles.

In any case, responsive to selection of the selector 714, the device may then present the example GUI 800 of FIG. 8 on its display. As shown, the GUI 800 may include a prompt 802 that the 3D passcode has been successfully set. The GUI 800 may also include a selector 804 that may be selectable for the user to re-enter the passcode-setting process as described above in reference to FIG. 7 if the user wanted to change/replace the passcode that was just set for whatever reason.

As also shown in FIG. 8, the GUI 800 may include a selector 806. The selector 806 may be selectable to enter the passcode-setting process again to add another passcode in embodiments where the user may wish to establish multiple passcodes for authentication in relation to the same or different functions executable at the device. FIG. 8 also shows that the GUI 800 may include a selector 808 that may be selectable to return to presentation of the settings GUI 600 on the display as already described above.

Moving on from FIG. 8, note that in examples where each 3D object is visually distinguishable from others based on different numbers, letters, or photos/videos from a photo gallery being used, the visual arrangement of the 3D objects in the virtual space may be the same for each instance of passcode input/authentication. But in other examples, to further increase digital security, the 3D objects may be randomly shuffled and presented at different virtual locations within the same virtual space for each instance so that the user, already knowing which sequence the particular 3D objects are to be selected in, may still enter the passcode but with an additional layer of complexity being introduced to further confuse others who might have, e.g., witnessed the user performing arm gestures in virtual space in a given instance.

It may now be appreciated that selection of 3D objects in the user's preset sequence while in virtual space provides a way for the user to securely digitally authenticate themselves within a virtual environment that others would not be able to see to then discern the passcode themselves. This is particularly true according to the personal photo gallery example above, as the photos may be unique and specific to the user, thereby creating further ambiguity.

Accordingly, it may now be appreciated that present principles provide for an improved computer-based user interface that increases the functionality, ease of use, and digital security of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor and comprising instructions executable by the at least one processor to:
present, on a display and in virtual space, at least first and second three-dimensional (3D) objects to which user input is directable in a particular continuous gesture sequence to provide a passcode associated with the device, the first and second 3D objects being established respectively by first and second floating spheres;
identify receipt of the passcode based on detection of first user input directed in the particular continuous gesture sequence to the first and second 3D objects;
identify, subsequent to the detection of the first user input, selection of the second 3D object a second time; and
authenticate a user responsive to the identifications.

2. The device of claim 1, wherein the first and second 3D objects are presented on the display at different respective virtual depths such that the first and second 3D objects are virtually selectable at the respective virtual depths to provide the passcode.

3. The device of claim 1, wherein the first and second floating spheres are numbered with different numbers.

4. The device of claim 1, wherein the first and second floating spheres are lettered with different letters.

5. A method, comprising:
presenting, on a display and in virtual space, at least first and second three-dimensional (3D) objects to which user input is directable in a particular sequence to provide a passcode associated with the device, the first and second 3D objects being established respectively by first and second floating spheres;
identifying receipt of the passcode based on detection of first user input directed in the particular sequence to the first and second 3D objects;
identifying, subsequent to the detection of the first user input, selection of the second 3D object a second time; and
permitting access to one or more functions of a device responsive to the identifications;
wherein to identify receipt of the passcode, the method comprises detecting a continuous gesture transitioning between and also directed to the first and second 3D objects.

6. The method of claim 5, comprising:
to identify receipt of the passcode, detecting selection of the first 3D object as presented at a first virtual depth relative to a user and detecting selection of the second 3D object as presented at a second virtual depth relative to the user, the second virtual depth being different from the first virtual depth.

7. The method of claim 5, comprising:
authenticating a user responsive to the identifications to permit access to the one or more functions of the device.

8. The method of claim 5, wherein the first and second floating spheres are numbered with different numbers.

9. The method of claim 5, wherein the first and second floating spheres are lettered with different letters.

10. At least one computer readable storage medium (CRSM) that is not a transitory signal, the at least one computer readable storage medium comprising instructions executable by at least one processor to:
- present, on a display and in virtual space, at least first and second three-dimensional (3D) objects to which user input is directable in a particular continuous gesture sequence to provide a passcode associated with the device, the first and second 3D objects being established respectively by first and second floating spheres;
- identify receipt of the passcode based on detection of first user input directed in the particular continuous gesture sequence to the first and second 3D objects;
- identify, subsequent to the detection of the first user input, selection of the second 3D object a second time; and
- unlock, responsive to the identifications, a function associated with a device.

11. The CRSM of claim 10, wherein the instructions are executable to:
- to identify receipt of the passcode, detect selection of the first 3D object while a user virtually stands at a first virtual location and detect selection of the second 3D object while the user virtually stands at a second virtual location that is different from the first virtual location.

12. The CRSM of claim 10, wherein the instructions are executable to:
- to identify receipt of the passcode, detect selection of the first 3D object as presented at a first virtual depth relative to a user and detect selection of the second 3D object as presented at a second virtual depth relative to the user, the second virtual depth being different from the first virtual depth.

13. The CRSM of claim 10, wherein the first and second floating spheres are numbered with different numbers for selection in the particular continuous gesture sequence.

14. The CRSM of claim 10, wherein the first and second floating spheres are lettered with different letters for selection in the particular continuous gesture sequence.

* * * * *